Oct. 1, 1957    R. C. LEGAT    2,807,851
BELT CONNECTION
Filed July 16, 1954
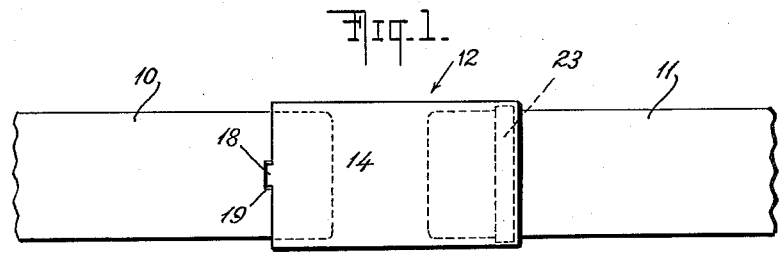
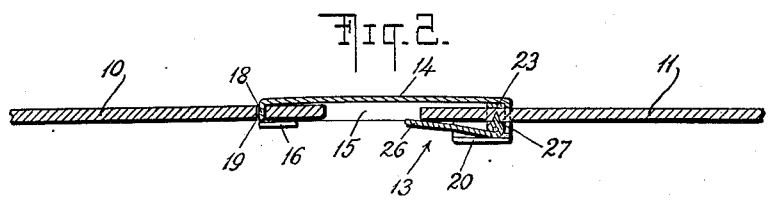
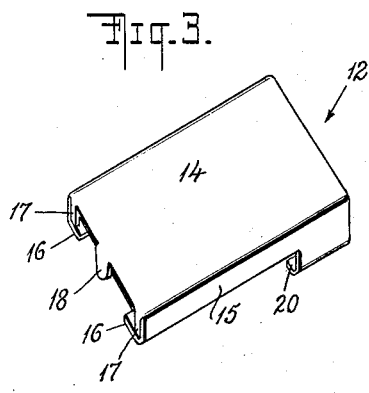
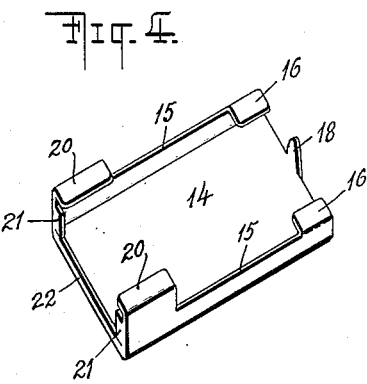
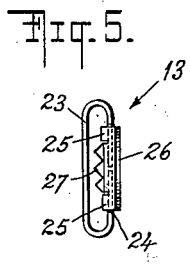
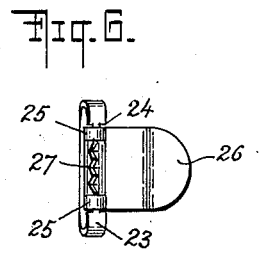
INVENTOR.
ROBERT C. LEGAT
BY
ATTORNEYS

United States Patent Office 2,807,851
Patented Oct. 1, 1957

2,807,851

BELT CONNECTION

Robert C. Legat, New Britain, Conn., assignor to G. E. Prentice Mfg. Co., Kensington, Conn., a corporation of Connecticut Application July 16, 1954, Serial No. 443,806

7 Claims. (Cl. 24—170)

This invention relates to adjustable devices for connecting the ends of belts or separate strap members forming part of a garment and has for its general object the provision of an improved device of this type.

A more particular object of the invention is to provide a belt connection of such simple construction that it may be readily and conveniently fabricated and assembled.

Another object of the invention is to provide a belt connection which may be readily and conveniently mounted and adjusted on belt ends and which will be simple to operate.

Other objects of the invention, as well as the advantages and novel features of construction thereof, will become apparent in the perusal of the following description when read in connection with the accompanying drawings, in which Fig. 1 is a front view of belt ends joined by an adjustable belt connection embodying the features of the invention;

Fig. 2 is a longitudinal sectional view of the construction shown in Fig. 1;

Fig. 3 is a front perspective view of the front part of the belt connection;

Fig. 4 is a rear perspective view of the part shown in Fig. 3;

Fig. 5 is an end view of the other part of the belt connection with the finger piece thereof in advanced position; and Fig. 6 is a front view of such other part with the finger piece thereof in retracted position.

In Figures 1 and 2 of the drawings, the reference numerals 10 and 11 designate the ends of a belt on which are mounted the belt connection parts designated generally by the numerals 12 and 13. The ends 10 and 11 of the belt or strap are both of a single uniform thickness throughout their lengths and may be made of leather, plastic or other suitable materials. The two belt ends also may be connected together in the form of the usual belt or strap, or may be separate parts forming part of a garment.

The connecting device or part 12 is removably attached to belt end 10, and is composed of a single piece of sheet metal formed to provide a rectangularly-shaped plate 14, the outer surface of which constitutes the face of the belt connection and may be suitably decorated. The plate 14 has integrally connected to its longitudinally extending edges two side walls 15, 15 between which the belt ends 10 and 11 are located. The inner ends of the side walls 15, 15 are provided with ears 16, 16 extending inwardly in opposed relation and disposed in substantial parallelism with the plate 14. Plate 14 is provided at its inner end with a pair of extensions 17, 17 which extend inwardly at right angles to such plate so that the outer side edges of such extensions are adjacent to the inner end surfaces of the side walls 15, 15 and the ends of such extensions engage the outer ends of the ears 16, 16 adjacent to such side walls. The extensions 17, 17 rigidify the side walls 15, 15 and the ears 16, 16 against possible displacement during usage, and together with plate 14 and ears 16, 16, define the opening in part 12 into which belt end 10 is inserted. Projecting inwardly from and integral with the center of the inner end edge of plate 14 is a prong 18 which extends into an opening 19 formed in belt end 10 to securely fasten part 12 of the connection to such belt end. When so secured, the extensions 17, 17 and ears 16, 16 coact with the prong 18 to prevent pivotal movement of the belt end 10 on the prong and to maintain such belt end and part 12 in proper relation while in use. The part 12 may be readily secured in a new position on belt end 10 simply by withdrawing prong 18 from hole 19, shifting such part to the desired position on the belt end and reinserting the prong in the material of such belt end.

Integral with the outer ends of the side walls 15, 15 of plate 14 is a pair of ears 20, 20 which project rearwardly from such walls and then extend toward each other to embrace the sides of the connection part 13. Integral with the outer edges of ears 20, 20 are stops 21, 21 which together with such ears form sockets for receiving the sides or ends of the connection part 13. The outer end of the plate 14 is inturned to form a wall or stop 22 which coacts with the stops 21, 21 to limit the outward movement of part 13 relative to part 12 under an applied outward force.

The connection part 13 adjustably attached to belt end 11 is composed of a strip 23 of suitable metal material having a rectangular cross-section and bent into the form of a substantially rectangularly-shaped band or loop. The opening of the band or loop has a width slightly greater than the thickness of the belt end 11 and a length slightly greater than the width of such belt end, so that the belt end 11 may be inserted or removed readily from such loop, and yet such band will snugly embrace such belt end. The opposed ends 24, 24 of the band 30 are reduced in section and are substantially circular in cross-section to provide journals for the bearings 25, 25 formed on a finger piece 26. Between the bearings 25, 25, the finger piece is formed to provide teeth 27 which engage in the material of the belt end when the finger piece 26 is pivoted downwardly toward the end of belt end 11 and against the undersurface of the latter, as shown in Fig. 2 of the drawings. When so secured, the finger piece 26 will securely hold the band 23 in place on the belt end against forces tending to move it off such belt end. The part 13 however, may be adjusted readily on the belt end 11 by lifting the finger piece 26 to disengage the teeth 27 and then shifting the band 23 to the new position desired, after which the finger piece 26 is again pivoted to locking position.

It will be understood from the foregoing, that the parts 12 and 13 of the connection described, may be readily joined by inserting the ends of band 23 of part 13 into the sockets formed by the extensions 20 and stops 21 on plate 14 in part 12 (note Fig. 2). The parts may be readily disconnected by slipping the part 13 out of the sockets formed in part 12.

While I have described and illustrated preferred embodiments of my invention, it will be apparent to those skilled in the art that changes may be made therein without departing from the spirit of the invention or the scope of the appended claims.

I claim:

1. A connection for two flat end parts comprising a member constituted of an integral piece of sheet material and including a face plate to be superimposed on the flat end of one of said parts, a first pair of inwardly extending ears integrally connected to the side edges of said plate at the inner end thereof and receiving therebetween the flat end of said part, a second pair of ears integrally connected to the side edges of said plate at the outer end thereof and extending inwardly at right angles to said plate and then extending toward each other, the free ends of said ears being spaced apart to provide an opening through which said other end part may be readily inserted in flat condition, and stop members integrally connected to said plate and located at the outer side of said outer ears within the angle of bend thereof, said outer ears and stops forming spaced receiving sockets at the outer end of said plate and through which the flat end of said other part is enabled to extend, means between said first pair of ears for securing said plate to the flat end of said part, a transverse member on said other end part providing a pair of end shoulders projecting beyond the side edges of said other end part to be received in said sockets, said shoulders being removably insertable into said sockets at the inner side of said outer ears and being prevented from passing outwardly therethrough by said stop member, and means for detachably securing said transverse member to said other end part.

2. A connection for two flat end parts comprising a member constituted of an integral piece of sheet material and means detachably engageable with said member, said member including a face plate to be superimposed on the flat end of one of said parts, a first pair of ears receiving therebetween the flat end of said part, said ears being integrally connected to the side edges of said plate at the inner end thereof and having their projecting ends extending toward each other in parallelism with said plate, a prong integrally connected to the inner end edge of said plate between the projecting ends of said ears and extending transversely through said end part, and said member including a second pair of ears integrally connected to the side edges of said plate at the outer end thereof and extending inwardly at right angles to said plate and then extending toward each other, the free ends of said ears being spaced apart to provide an opening through which said other end part may be readily inserted in flat condition, and stop members integrally connected to said plate and located at the outer side of said outer ears within the angle of bend thereof, said outer ears and stops forming spaced receiving sockets at the outer end of said plate and through which the flat end of said other part is enabled to extend, said detachably engageable means including a transverse member on said other end part providing a pair of end shoulders projecting beyond the side edges of said other end part to be received in said sockets, said shoulders being removably insertable into said sockets at the inner side of said outer ears and being prevented from passing outwardly therethrough by said stop member, and means for detachably securing said transverse member to said other end part.

3. A connection for two flat end parts comprising a member constituted of an integral piece of sheet material and including a face plate to be superimposed on the flat end of one of said parts, a pair of inwardly projecting side walls integrally connected to the side edges of said plate, a first pair of inwardly extending ears integrally connected to the inner end portions of said side walls and receiving therebetween the flat end of said part, a second pair of ears integrally connected to the outer end portions of said side walls and extending inwardly therefrom at right angles to said plate and then extending toward each other, the free ends of said ears being spaced apart to provide an opening through which said other end part may be readily inserted in flat condition, and stop members integrally connected to the outer ends of said side walls and located at the outer side of said outer ears within the angle of bend thereof, said outer ears and stops forming spaced receiving sockets at the outer end of said plate and through which the flat end of said other part is enabled to extend, means between said first pair of ears for securing said plate to the flat end of said part, a transverse loop-shaped member encircling said other end part and providing a pair of end shoulders projecting beyond the side edges of said other end part to be received in said sockets, said shoulders being removably insertable into said sockets at the inner side of said outer ears and being prevented from passing outwardly therethrough by said stop member, said member having a reduced cross-sectional area on the inner leg of the loop formed thereby, a finger piece pivotally mounted on such reduced portion of said member, and teeth provided on the pivoted end of said finger piece to engage the portion of said other end part embraced by said loop-shaped member.

4. A connection for two flat end parts comprising a member constituted of an integral piece of sheet material and means detachably engageable with said member, said member including a face plate to be superimposed on the flat end of one of said parts, a pair of inwardly projecting side walls integrally connected to the side edges of said plate, a first pair of ears receiving therebetween the flat end of said part, said ears being integrally connected to the inner end portions of said side walls and having their projecting ends extending toward each other in parallelism with said plate, a pair of spaced inwardly projecting extensions integrally connected to the inner end edge of said plate adjacent to said side walls and located at the outer side of said ears within the angle of bend thereof, a prong integrally connected to the inner end edge of said plate between said extensions and extending transversely through said end part, and said member including a second pair of ears integrally connected to the outer end portions of said side walls and extending inwardly therefrom at right angles to said plate and then extending toward each other, the free ends of said ears being spaced apart to provide an opening through which said other end part may be readily inserted in flat condition, and stop members integrally connected to the outer ends of said side walls and located at the outer side of said outer ears within the angle of bend thereof, said outer ears and stops forming spaced receiving sockets at the outer end of said plate and through which the flat end of said other part is enabled to extend, means between said first pair of ears for securing said plate to the flat end of said part, a transverse loop-shaped member encircling said other end part and providing a pair of end shoulders projecting beyond the side edges of said other end part to be received in said sockets, said shoulders being removably insertable into said sockets at the inner side of said outer ears and being prevented from passing outwardly therethrough by said stop member, said member having a reduced cross-sectional area on the inner leg of the loop formed thereby, a finger piece pivotally mounted on such reduced portion of said member, and teeth provided on the pivoted end of said finger piece to engage the portion of said other end part embraced by said loop-shaped member.

5. A connection for two flat end parts comprising a member constituted of an integral piece of sheet metal and means detachably engageable with said member, said member including a face plate to be superimposed on the flat end of one of said parts, a pair of inwardly projecting side walls integrally connected to the side edges of said plate, a first pair of ears integrally connected to the inner end portions of said side walls, said ears extending toward each other in opposed relation and adapted to embrace the flat end of said part, means between said ears and coactable with the latter to secure said plate to the flat end of said part, a second pair of ears integrally connected to the outer end portions of said side walls and having their outer ends turned inwardly in opposed relation to embrace the ends of a transverse member forming part of the detachably engageable means on said other end part, the transverse member being removably insertable into such position at the inner side of said second pair of ears and the free ends of such ears being spaced apart to provide an opening through which said other part may be readily moved in flat condition when the transverse member is so inserted, the outer end of said face plate being inturned and forming a stop to prevent insertion of the transverse member into the said position from the outer side of said second pair of ears and to retain such transverse member in such embraced position between said second pair of ears against longitudinal forces tending to pull such transverse member outwardly through said second pair of ears, said detachably engageable means comprising a transverse member mounted on said other end part and formed to be detachably received by said second pair of ears with its ends embraced by the latter, said transverse member having a transverse edge engageable with the outer inturned end of said face plate, and means for detachably securing said transverse member to said other end part.

6. A connection for two flat end parts comprising a device connectable to one of said parts, and means connectable to the other of said parts and detachably engageable with said device, said device comprising a flat plate to be superimposed on the flat end of said part, a pair of ears integrally connected to the inner side end portions of said plate and formed to embrace the flat end of said part, fastening means between said ears and cooperable with the latter to secure said plate in proper position to the flat end of said part, a second pair of ears integrally connected to the outer side end portions of said plate and having their outer ends turned inwardly to embrace the ends of a transverse member forming part of said detachably engageable means, the transverse member being removably insertable into such position at the inner side of said second pair of ears and the free ends of such ears being spaced apart to provide an opening through which said other part may be readily moved in flat condition when the transverse member is so inserted, stop means integrally connected to the outer end portion of said plate for preventing insertion of the transverse member into the said position from the outer side of said second pair of ears and for retaining said transverse member in such embraced position between said second pair of ears against longitudinal forces tending to pull such transverse member outwardly through said second pair of ears, said detachably engageable means comprising a transverse member mounted on said other end part and formed to be detachably received by said second pair of ears with its ends embraced by the latter, said transverse member having a transverse edge engageable with said stop means, and means for detachably securing said transverse member to said other end part.

7. A connection for two flat end parts such as claimed in claim 6 in which said stop means comprises an elongated stop member extending transversely of said plate adjacent to the outer side of said second pair of ears, and in which said transverse member is loop-shaped and is slidably mounted on said other end part.

References Cited in the file of this patent
UNITED STATES PATENTS

| | | |
|---|---|---|
| 2,156,647 | Zeman | May 2, 1939 |
| 2,609,577 | Beyer | Sept. 9, 1952 |

FOREIGN PATENTS

| | | |
|---|---|---|
| 457,889 | Great Britain | Dec. 8, 1936 |